(12) United States Patent
Huang

(10) Patent No.: US 7,454,574 B2
(45) Date of Patent: Nov. 18, 2008

(54) PRE-FETCH CONTROL METHOD

(75) Inventor: Ming Chuan Huang, FengYuan (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 234 days.

(21) Appl. No.: 11/327,398

(22) Filed: Jan. 9, 2006

(65) Prior Publication Data

US 2006/0161736 A1  Jul. 20, 2006

(30) Foreign Application Priority Data

Jan. 18, 2005  (TW) ............................... 94101433 A

(51) Int. Cl.
*G06F 12/06* (2006.01)
*G06F 12/12* (2006.01)

(52) U.S. Cl. ....................................... 711/137

(58) Field of Classification Search .................. 711/137
See application file for complete search history.

(56) References Cited

U.S. PATENT DOCUMENTS 6,785,771 B2 * 8/2004 Ash et al. .................... 711/136
6,895,475 B2 * 5/2005 Volpe et al. .................. 711/137
2006/0112233 A1 * 5/2006 Hu et al. ...................... 711/138

* cited by examiner

*Primary Examiner*—Kevin L Ellis
*Assistant Examiner*—Hamdy S Ahmed
(74) *Attorney, Agent, or Firm*—Muncy, Geissler, Olds & Lowe, PLLC

(57) ABSTRACT

A pre-fetch control method comprises the following steps. First, after a data request for M-bytes request data sent from a cache controller is received, a determination is made on whether the M-bytes request data are found in the pre-fetch buffer. Then, a further determination is made on whether a combined access control is enabled if the M-bytes request data are not found in the pre-fetch buffer. If the combined access is not enabled, a data request for the M-bytes request data is sent out to an external unit. If the combined access control is enabled, a data request for the M-bytes request data and n*M-bytes extra data is sent out to an external unit. The n*M-bytes extra data is stored in the pre-fetch buffer.

6 Claims, 6 Drawing Sheets

PRE-FETCH CONTROL METHOD

This application claims the benefit of the filing date of Taiwan Application Ser. No. 094101433, filed on Jan. 18, 2005, the content of which is incorporated herein by reference.

BACKGROUND OF THE INVENTION (a) Field of the Invention

The invention relates to a pre-fetch control method and, more particularly, to a pre-fetch control method in conjunction with a combined access control.

(b) Description of the Related Art

A typical architecture of a computer includes a processor core, a L1 I-cache, a L1 D-cache, a pre-fetch cache unit, and a main memory. When a processor core reads instructions from the L1 I-cache, the pre-fetch cache unit, and the main memory, the access priority over the L1 I-cache are higher than those over the pre-fetch cache unit, and the access priority over the pre-fetch cache unit are higher than those over the main memory. Hence, the performance of a computer is enhanced when the hit rates of L1 I-cache and the pre-fetch cache unit were increased.

FIG. 1 shows a schematic diagram illustrating the request procedure of a processor core, where an access request is missed in the L1 I-cache. The steps of the request procedure are listed below.

Step 1: The processor core 11 sends out a read instruction to the L1 I-cache 12 for a requested instruction.

Step 2: The requested instruction is missed in the L1 I-cache 12, and thus the L1 I-cache 12 sends out a new request to the pre-fetch cache unit 13.

Step 3: The pre-fetch unit 13 finds the requested instruction in a pre-fetch buffer (IPB) 14.

Step 4: The pre-fetch unit 13 transmits the requested instruction to the L1 I-cache 12.

Step 5: The L1 I-cache 12 transmits the requested instruction to the processor core 11.

FIG. 2 shows a schematic diagram illustrating the request procedure of a processor core, where a requested instruction is missed both in the L1 I-cache and the pre-fetch buffer. The steps of the request procedure are listed below.

Step 1: The processor core 11 sends out a read instruction to the L1 I-cache 12 for a requested instruction.

Step 2: The requested instruction is missed in the L1 I-cache 12, and thus the L1 I-cache 12 sends out a new request to the pre-fetch unit 13.

Step 3: The requested instruction is also missed in the instruction pre-fetch buffer 14, and thus the pre-fetch cache unit 13 sends out a new request to a bus interface unit (BIU) 15.

Step 4: The pre-fetch cache unit 13 receives the requested data transmitted from the bus interface unit 15 and sends it to the L1 I-cache 12.

Step 5: The L1 I-cache 12 transmits the requested instruction to the processor core 11.

Typically, the access time of the processor core 11 for acquiring instruction from the L1 I-cache 12 is faster than acquiring instruction from the pre-fetch cache unit 13 by several times, and the access time of the processor core 11 for acquiring instruction/data from the pre-fetch unit 13 is faster than acquiring instruction/data from the bus interface unit 15 by several times. Further, the access time of the processor core 11 for acquiring instruction from the L1 I-cache 12 is faster than acquiring instruction from the bus interface unit 15 by tens of times. Hence, the system performance is enhanced when the hit rates of the L1 I-cache and the pre-fetch unit are increased. However, more complicated pre-fetch algorithms and circuits are needed to increase the hit rate, thus resulting in a high cost and power consumption. Further, pre-fetching tasks may occupy the system bus for a long time, which impacts the system performance. However, prior-art references always focus on how to improve the hit rate but fail to provide a discussion of another factor such as the system performance.

BRIEF SUMMARY OF THE INVENTION

In view of the above-mentioned problems, an object of the invention is to provide a pre-fetch control method where the requested data amount from a bus interface unit is at least doubled by a combined access control to reduce data access time.

To achieve the above-mentioned object, a pre-fetch control method comprises the following steps. First, after a data request for M-bytes request data sent out by a cache controller is received, a determination is made on whether the M-bytes request data are found in the instruction pre-fetch buffer. Then, the M-bytes request data are transmitted to a cache controller when they were found in the instruction pre-fetch buffer, and a further determination is made on whether a combined access control is enabled if the M-bytes request data are not found in the instruction pre-fetch buffer. If the combined access control is not enabled, a data request for the M-bytes request data is sent out to an external unit, and the M-bytes request data returned from the external unit are transmitted to the cache controller. On the contrary, if the combined access control is enabled, a data request for the M-bytes request data and n*M-bytes extra data ($n \geq 1$) is sent out to the external unit. Then, the M-bytes request data is transmitted to the cache controller and the n*M-bytes extra data are stored in the pre-fetch buffer.

Through the design of the invention, since the pre-fetch unit sends out a request of reading at least two times of M-bytes data to the bus interface unit, the time that pre-fetch tasks occupy the bus interface unit and the idle time of the CPU are both reduced.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

Typically, external units such as a memory device, a hard disk, and a storage device use a data access mode, which is named burst-mode. A burst-mode access of main memory such as a SDRAM does not spend CAS (column address strobe) access time for each word when the controller accesses a plurality of words. In that case, the spend time for accessing 2*M-bytes (two times of M-bytes) once is shorter than that for successively accessing M-bytes data twice from a burst-mode external unit; for example, the former may require 34 clock cycles while the latter may require 52 clock cycles. According to this characteristic, the invention provides a method where the data amount accessed from an external unit is more than twofold as compared to the data amount requested by a cache controller, under the condition that a combined access control is enabled. Then, part or all of the received data are stored in the pre-fetch buffer (PB) to reduce the time that pre-fetch tasks occupy the bus interface unit (BIU) 15.

Figure 1:
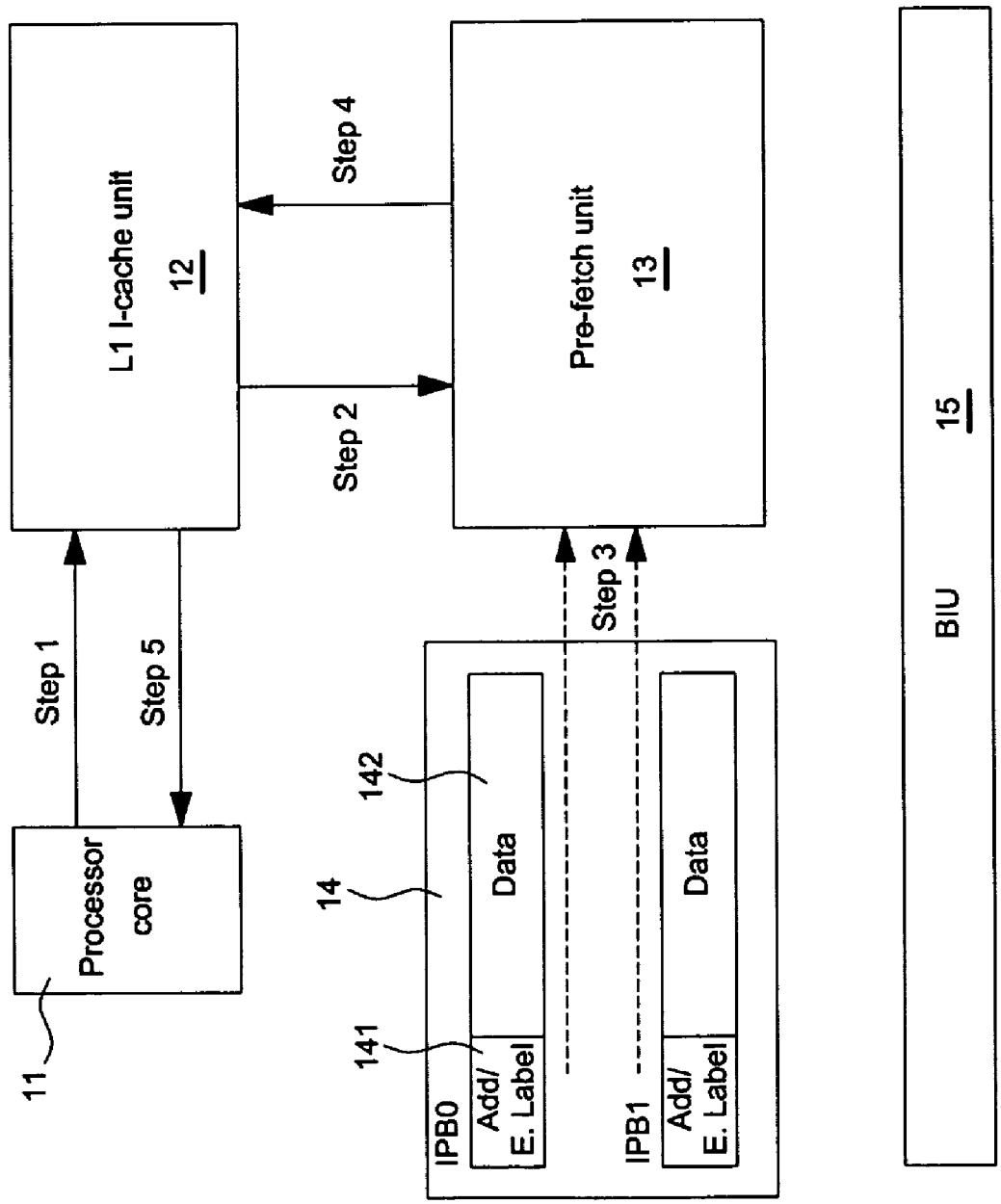
FIG. 1 shows a schematic diagram illustrating the conventional request procedure of a processor core, where a requested instruction is missed in the L1 I-cache.
Figure 2:
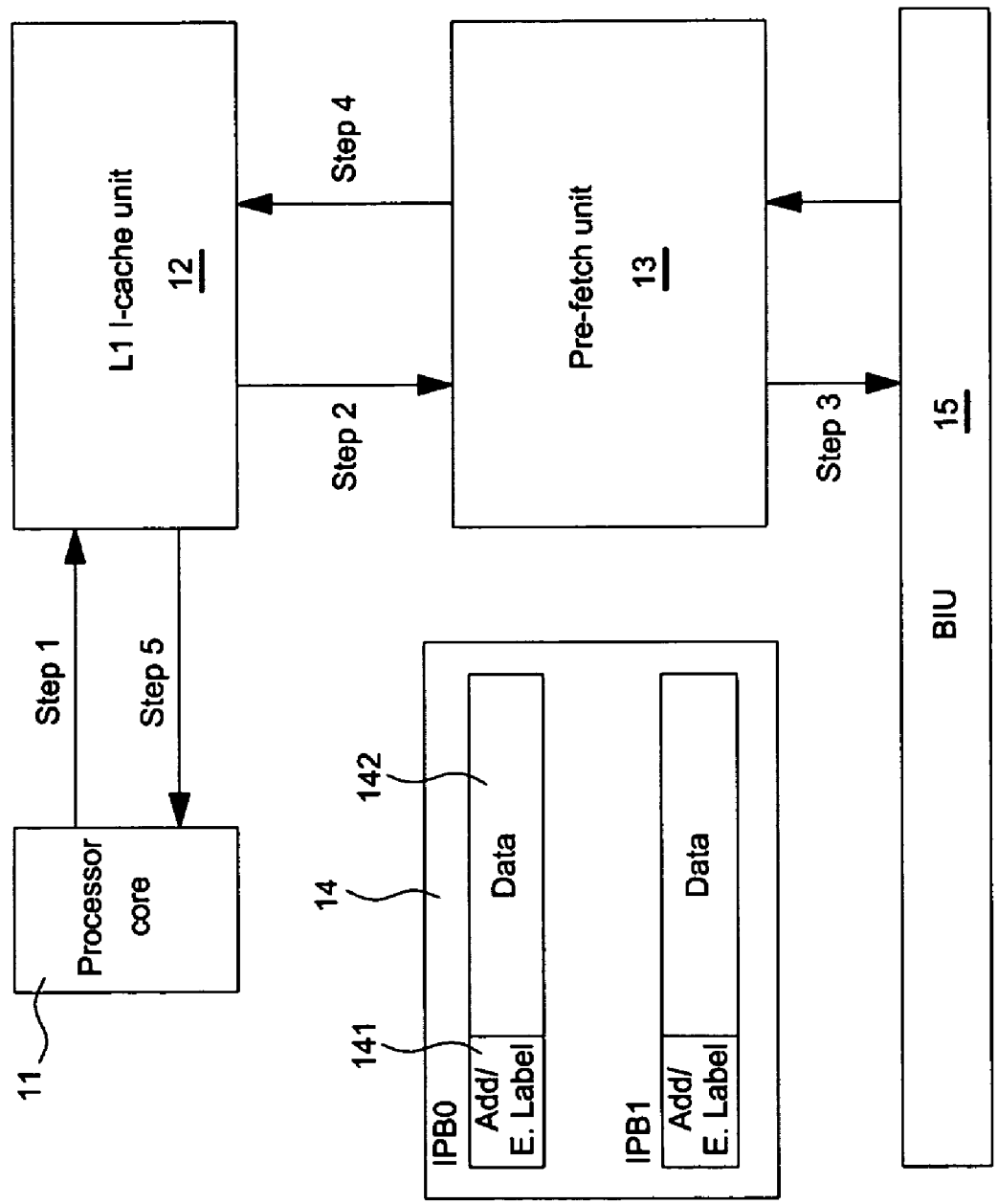
FIG. 2 shows a schematic diagram illustrating the conventional request procedure of a processor core, where a requested instruction is missed both in the L1 I-cache and the pre-fetch buffer.
Figure 3:
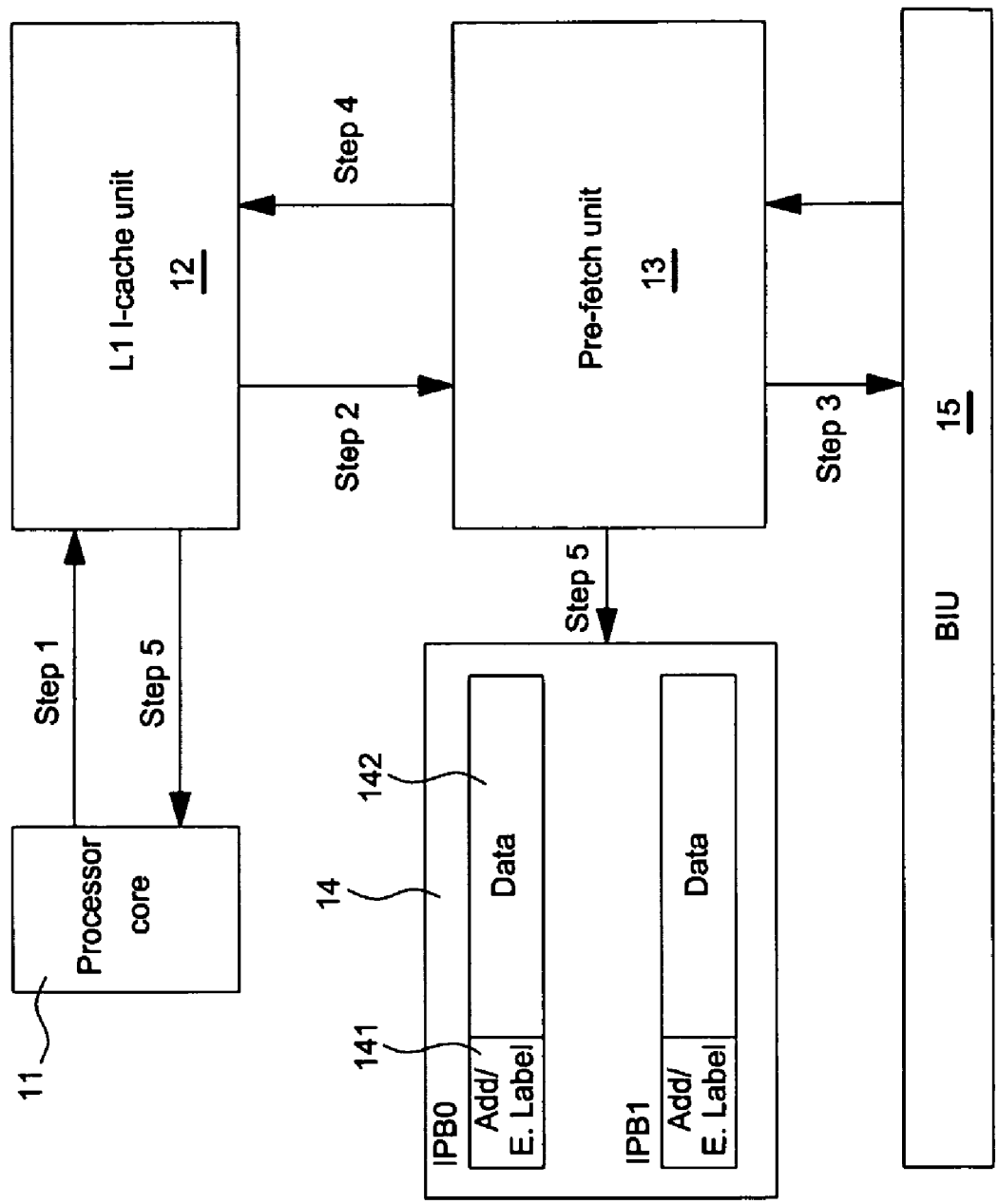
FIG. 3 shows a schematic diagram illustrating the request procedure of a processor core according to the invention, where a requested instruction is missed both in the L1 I-cache and the pre-fetch buffer.

FIG. 3 shows a schematic diagram illustrating the request procedure of a processor core, where a requested instruction is missed both in the L1 I-cache and the instruction pre-fetch buffer (IPB). The steps of the request procedure are listed below.

Step 1: The processor core 11 sends out a read instruction to the L1 I-cache 12 for the requested instruction.

Step 2: The requested instruction is missed in the L1 I-cache 12, and thus the L1 I-cache 12 sends out a request of reading M-bytes data to the pre-fetch unit 13.

Step 3: The requested instruction is missed in the instruction pre-fetch buffer 14. However, the pre-fetch cache unit 13 detects that the combined access control is enabled, and thus it sends out a request of reading 2*M-bytes data to the bus interface unit 15.

Step 4: The pre-fetch unit 13 receives the data transmitted from the bus interface unit 15 and transmits the former M-bytes data to the L1 I-cache 12.

Step 5: Cache unit sends out the required data to processor core. The pre-fetch unit 13 fills the remaining M-bytes data into the instruction pre-fetch buffer 14.

Herein, the combined access control is enabled when the L1 I-cache 12 sends out two requested instructions with consecutive addresses. In other words, the processor core 11 requires instructions for two consecutive addresses. Under the circumstance, the processor core 11 may require instructions or data for subsequent consecutive addresses. Thus, according to the invention, the pre-fetch cache unit 13 sends out the request of reading 2*M-bytes data to the bus interface unit 15, transmits the former reading M-bytes data to the L1 cache unit 12, and fills the remaining reading M-bytes data to the instruction pre-fetch buffer 14. Therefore, if the processor core 11 indeed requires instructions for subsequent consecutive addresses, the instructions are directly read out from the instruction pre-fetch buffer 14, and thus the processor core 11 no longer needs to send out the M-bytes request to the bus interface unit 15. Thereby, the spend time caused by sending out the M-bytes request to the bus interface unit 15 and the idle time of the processor core 11 are both reduced. For example, according to the conventional method, two M-bytes requests sent out to the bus interface unit 15 requires about 52 clock cycles; in comparison, one 2*M-byes request sent out to the bus interface unit 15 requires about clock 34 cycles according to the invention.

Figure 4:
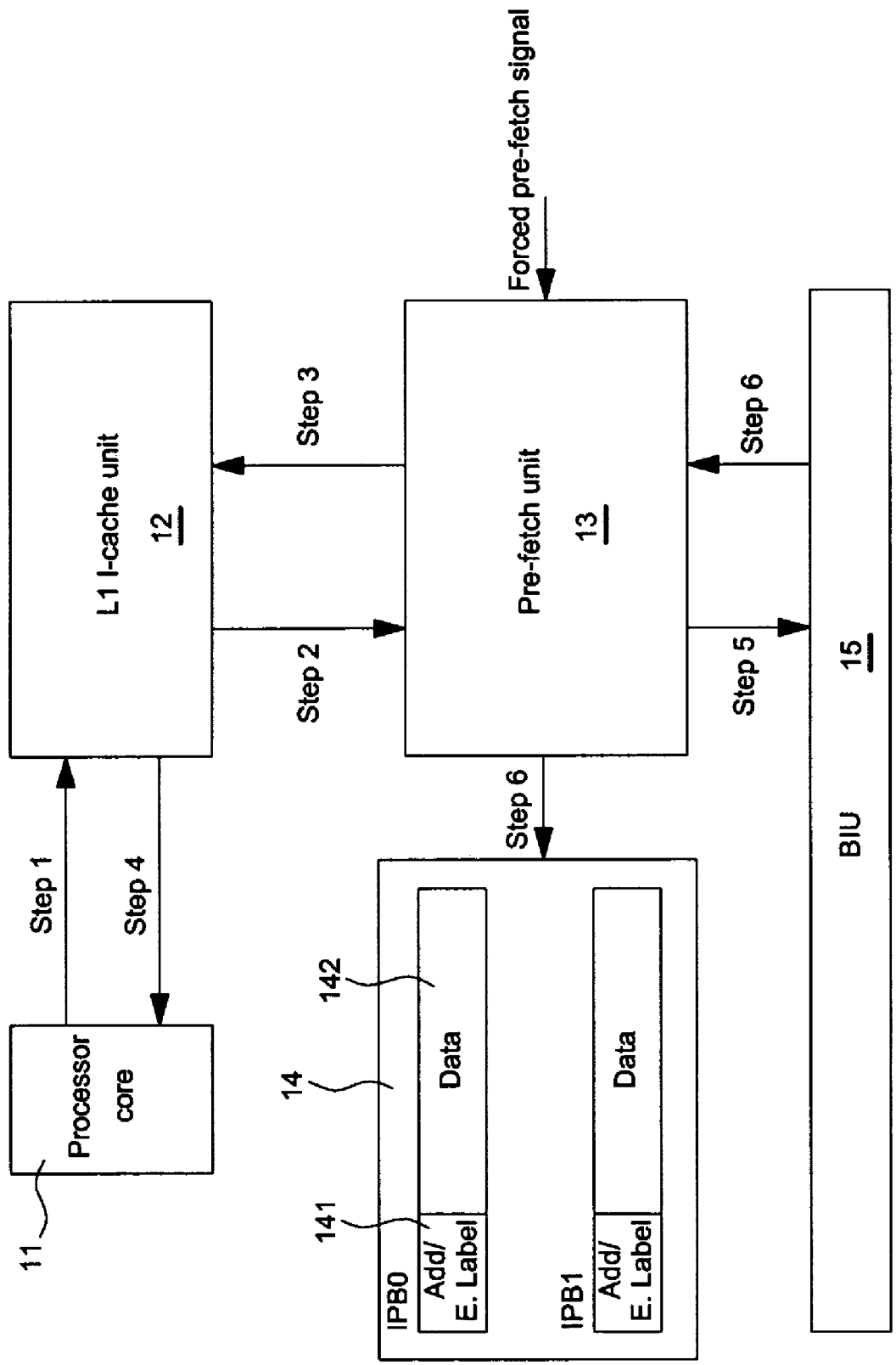
FIG. 4 shows a schematic diagram illustrating the request procedure of a processor core according to the invention, where a requested instruction is missed in the L1 I-cache but found in the pre-fetch buffer.

FIG. 4 shows a schematic diagram illustrating the request procedure from a processor core, where a requested instruction is missed in the L1 I-cache but found in the instruction pre-fetch buffer. Further, the pre-fetch cache unit 13 also can receive a forced pre-fetch mechanism, which is produced by other hardware or micro-processing unit under certain circumstances, such as the micro-processing unit being forced to pre-fetch some data into a cache that is capable of enabling the pre-fetch mechanism. The steps of the request procedure are listed below.

Step 1: The processor core 11 sends out a read request to the L1 I-cache 12 for a requested instruction.

Step 2: The requested instruction is missed in the L1 I-cache 12, and thus the L1 I-cache 12 sends out a request of reading M-bytes data to the pre-fetch cache unit 13.

Step 3: The requested datum are found in the pre-fetch buffer 14 and then transmitted to the L1 I-cache 12.

Step 4: The requested datum are sent to processor core by the L1 I-cache 12.

Step 5: The pre-fetch unit 13 detects that the forced to pre-fetch is enabled, and thus it sends out a request of reading 2*M-bytes data to the bus interface unit 15.

Step 6: The pre-fetch cache unit 13 fills the 2*M-bytes data into the instruction pre-fetch buffer 14.

Herein, the combined access control is enabled when the requested instruction is found in one instruction pre-fetch buffer 14, and other instruction pre-fetch buffers 14 are void, invalid, without the data of subsequent consecutive addresses, or showing that the forced pre-fetch signal is enabled. Under the circumstance, the processor core 11 may require instructions for subsequent consecutive addresses. Thus, according to the invention, the pre-fetch cache unit 13 sends out the request of reading 2*M-bytes data to the bus interface unit 15 and fills the 2*M-bytes data into the pre-fetch buffer 14. Therefore, if the processor core 11 indeed requires instructions for subsequent consecutive addresses, the instructions are directly read out in the instruction pre-fetch buffer 14, and thus the processor core 11 no longer needs to send out the M-bytes request to the bus interface unit 15. Thereby, the spend time caused by sending out the request instruction to the bus interface unit 15 is reduced. Further, since the pre-fetch cache unit 13 sends out the request of reading 2*M-bytes data to the bus interface unit 15, the time that pre-fetch tasks occupy the bus interface unit 15 and the CPU is executing other task.

Figure 5A:
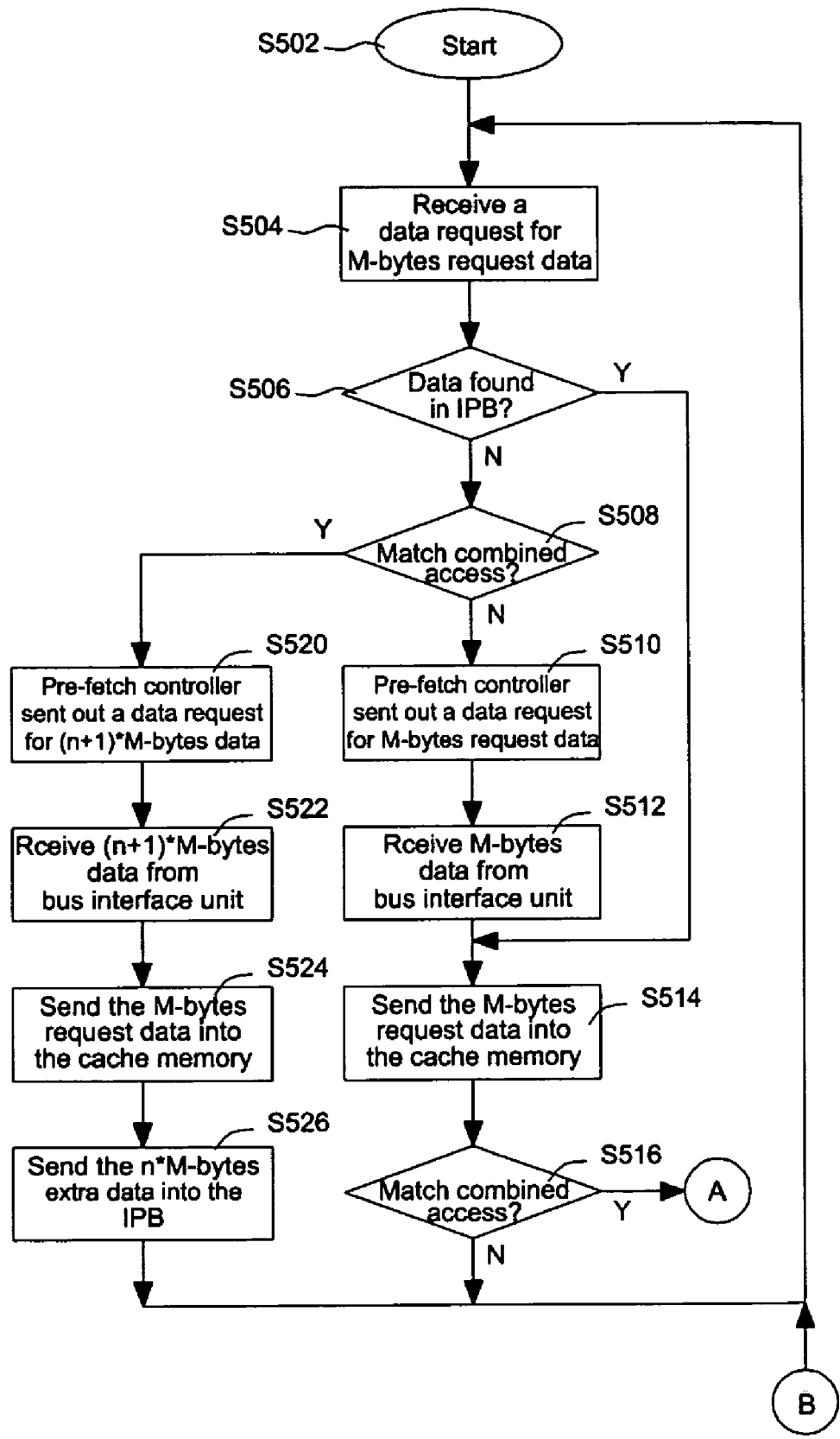
FIGS. 5A and 5B show flow diagrams illustrating the pre-fetch control method according to the invention.
Figure 5B:
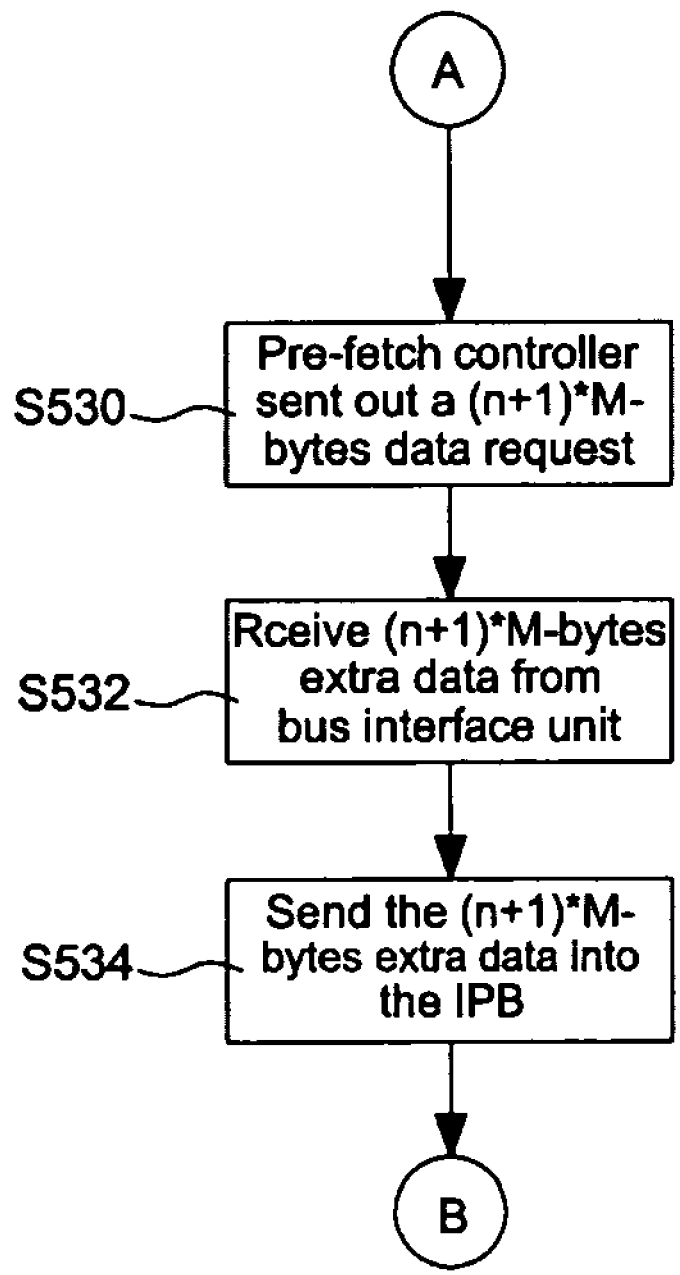

FIGS. 5A and 5B show flow diagrams illustrating the pre-fetch control method according to the invention. The steps of the pre-fetch control method are described below.

Step S502: Start.

Step S504: Receive a data request for M-bytes request data sent out by a cache controller. The cache controller sends out a data request for the M-bytes request data when the request data (or instructions) are missed in a cache memory.

Step S506: Determine whether the M-byte request data (or instructions) are found in an instruction pre-fetch buffer. If yes, go to step S514; if no, go to the next step.

Step S508: Determine whether a combined access control is enabled. Specifically, determine whether the former data requests are regarding consecutive addresses or whether an enabled forced pre-fetch signal is detected. If yes, go to step S520; if no, go to the next step.

Step S510: The pre-fetch controller sends out a data request for the M-bytes request data. Specifically, the pre-fetch controller sends out a data request for the M-bytes request data to a bus interface unit.

Step S512: The pre-fetch controller receives the M-bytes request data from the bus interface unit.

Step S514: Send the M-bytes request data into the cache memory.

Step S516: Determine whether a combined access control is enabled. Specifically, determine whether the M-bytes request data is found in one entry of pre-fetch buffer, and other entries of pre-fetch buffer are void, invalid, or without the data of subsequent consecutive addresses. If yes, go to step S530; if no, go to step S504.

Step S520: The pre-fetch controller sends out a data request for the M-bytes request data and n*M-bytes extra data, where n is an integer greater than 0. Specifically, the pre-fetch controller sends out a data request to the bus interface unit. The value of n is determined by the capacity of the instruction pre-fetch buffer.

Step S522: The pre-fetch controller receives M-bytes request data and n*M-bytes extra data from the bus interface unit.

Step S524: Fill the former M-bytes request data into a cache memory.

Step S526: Fill the received n*M-bytes extra data into the instruction pre-fetch buffer, and go to Step S504.

Step S530: The pre-fetch controller sends out a data request for (n+1)*M-bytes extra data, where n is an integer greater than 0. Specifically, the pre-fetch controller sends out a data request to the bus interface unit. The value of n is determined by the capacity of the instruction pre-fetch buffer.

Step S532: The pre-fetch controller receives (n+1)*M-bytes extra data from the bus interface unit.

Step S534: Fill the (n+1)*M-bytes data into the pre-fetch buffer, and go to Step S504.

The condition that matches the combined access control also includes a data request regarding specific memory addresses. For example, a memory area covering the specific memory addresses may be an auto pre-fetch memory section. When the requested addresses are stored in the auto pre-fetch memory section, the combined access control is also enabled.

Through the design of the invention, since the pre-fetch cache unit 13 sends out a data request of reading at least two times of M-bytes request data to the bus interface unit 15, the time that pre-fetch tasks occupy the bus interface unit 15 and the idle time of the CPU are both reduced by taking advantages of shorter time which is resulted in continuously reading at least two times of M-bytes requests.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A pre-fetch control method used in a system having a cache controller, a pre-fetch controller and an instruction pre-fetch buffer, the pre-fetch control method comprising the steps of:

receiving a data request for M-bytes requested data from the cache controller;

determining whether the M-bytes requested data are all found in the instruction pre-fetch buffer;

transmitting the M-bytes requested data to the cache controller and returning to the first step when the M-bytes requested data are all found in the instruction pre-fetch buffer;

determining whether a combined access control is matched when the M-bytes requested data are not all found in the instruction pre-fetch buffer;

sending out a data request to an external unit for the M-bytes requested data and transmitting the M-bytes requested data returned from the external unit to the cache controller when the combined access control is not matched; and sending out a data request to the external unit for the M-bytes requested data and n*M-bytes extra data (n≧1), transmitting the M-bytes requested data returned from the external unit to the cache controller and storing the n*M-bytes extra data returned from the external unit in the pre-fetch buffer when the combined access control is matched.

2. The pre-fetch control method as claimed in claim 1, wherein the combined access control is matched when the data request from the cache controller regarding two consecutive addresses.

3. The pre-fetch control method as claimed in claim 1, wherein the combined access control is matched when the data request from the cache controller regarding addresses stored in an auto pre-fetch range.

4. The pre-fetch control method as claimed in claim 1, wherein the combined access control is matched when an enabled forced pre-fetch mechanism is detected.

5. The pre-fetch control method as claimed in claim 1, wherein the combined access control is matched when the M-bytes requested data are found in the pre-fetch buffer.

6. A pre-fetch control method used in a system having a cache controller, a pre-fetch controller and an instruction pre-fetch buffer, the pre-fetch control method comprising the steps of:

receiving a data request for M-bytes requested data from the cache controller;

determining whether the M-bytes requested data are all found in the instruction pre-fetch buffer;

transmitting the M-bytes requested data to the cache controller when the M-bytes requested data are all found in the instruction pre-fetch buffer;

determining whether a first combined access control is matched when the M-bytes requested data are all found in the instruction pre-fetch buffer;

sending out a data request to the external unit for the M-bytes requested data and n*M-bytes extra data (n≧1) and storing the n*M-bytes extra data returned from the external unit in the pre-fetch buffer when the M-bytes requested data are all found in the instruction pre-fetch buffer and the combined access control is matched;

determining whether a combined access control is matched when the M-bytes requested data are not all found in the instruction pre-fetch buffer;

sending out a data request to an external unit for the M-bytes requested data and transmitting the M-bytes requested data returned from the external unit to the cache controller when the M-bytes requested data are not all found in the instruction pre-fetch buffer and the combined access control is not matched; and sending out a data request to the external unit for the M-bytes requested data and n*M-bytes extra data (n≧1), transmitting the M-bytes requested data returned from the external unit to the cache controller and storing the n*M-bytes extra data returned from the external unit in the pre-fetch buffer when the M-bytes requested data are not all found in the instruction pre-fetch buffer and the combined access control is matched.

* * * * *